(12) United States Patent
Tong et al.

(10) Patent No.: US 12,231,369 B2
(45) Date of Patent: Feb. 18, 2025

(54) METHOD FOR PROCESSING DATA AND WIRELESS ACCESS POINT

(71) Applicant: TP-LINK CORPORATION LIMITED, Hong Kong (CN)

(72) Inventors: Di Tong, Guangdong (CN); Changqiang Wu, Guangdong (CN)

(73) Assignee: TP-Link Corporation Limited, Hong Kong (CN)

( * ) Notice: Subject to any disclaimer, the term of this patent is extended or adjusted under 35 U.S.C. 154(b) by 0 days.

(21) Appl. No.: 18/753,643

(22) Filed: Jun. 25, 2024

(65) Prior Publication Data

US 2024/0348407 A1    Oct. 17, 2024

Related U.S. Application Data

(63) Continuation of application No. PCT/CN2022/140442, filed on Dec. 20, 2022.

(30) Foreign Application Priority Data

Dec. 31, 2021    (CN) .......................... 202111676906.1

(51) Int. Cl.
*H04L 5/00*    (2006.01)
(52) U.S. Cl.
CPC .................. *H04L 5/0055* (2013.01)
(58) Field of Classification Search
CPC .......... H04L 5/0055; H04W 52/0212; H04W 72/12; H04W 72/0446; H04W 52/0216
USPC .......................................................... 370/329
See application file for complete search history.

(56) References Cited

U.S. PATENT DOCUMENTS

| | | | |
|---|---|---|---|
| 2011/0128900 A1* | 6/2011 | Seok ..................... | H04W 74/04 370/311 |
| 2014/0003314 A1* | 1/2014 | Shu .................. | H04W 52/0212 370/336 |

FOREIGN PATENT DOCUMENTS

| | | |
|---|---|---|
| CN | 101288250 A | 10/2008 |
| CN | 101395835 A | 3/2009 |
| CN | 102769925 A | 11/2012 |
| CN | 103095425 A | 5/2013 |
| CN | 103095429 A | 5/2013 |
| CN | 103517419 A | 1/2014 |
| CN | 103687044 A | 3/2014 |
| CN | 106538025 A | 3/2017 |

(Continued)

OTHER PUBLICATIONS

The international search report of PCT application No. PCT/CN2022/140442, mail date Feb. 15, 2023.

(Continued)

*Primary Examiner* — Mang Hang Yeung
(74) *Attorney, Agent, or Firm* — The Sun IP Law

(57) ABSTRACT

A method and apparatus for processing data are disclosed in the present disclosure. The method includes: transmitting an identification frame to a target station, wherein the identification frame at least comprises station identification information, and the station identification information is configured to indicate the target station; receiving a predetermined acknowledgement frame returned by the target station; and transmitting a target frame to the target station according to the predetermined acknowledgement frame, wherein the target frame comprises a downlink transmission time and an uplink transmission time allocated to the target station.

8 Claims, 3 Drawing Sheets

(56) References Cited

FOREIGN PATENT DOCUMENTS

| | | | |
|---|---|---|---|
| CN | 108123781 | A | 6/2018 |
| CN | 111836369 | A | 10/2020 |
| CN | 114340011 | A | 4/2022 |
| KR | 20150017288 | A | 2/2015 |
| WO | 2010110619 | A2 | 9/2010 |
| WO | 2014010945 | A1 | 1/2014 |
| WO | 2015190779 | A1 | 12/2015 |

OTHER PUBLICATIONS

The search report of CN application No. 202111676906.1, issued on Nov. 20, 2024.

* cited by examiner

METHOD FOR PROCESSING DATA AND WIRELESS ACCESS POINT

CROSS-REFERENCE TO RELATED APPLICATION

The present disclosure claims the right of priority to Chinese Patent Application No. 202111676906.1, filed to the China National Intellectual Property Administration on Dec. 31, 2021 and entitled "Method and apparatus for processing data, computer-readable storage medium, and processor", which is incorporated in its entirety herein by reference.

TECHNICAL FIELD

The present disclosure relates to the field of wireless communication, in particular to a method and apparatus for processing data.

BACKGROUND

Power-save multi-poll (PSMP) is a type of power-save scheduling technology introduced in 802.11n. To be specific, after an access point (AP) transmits a PSMP management frame, a single PSMP frame is used in the PSMP sequence to schedule multiple stations, and corresponding downlink transmission resources and uplink transmission resources are allocated to each station (STA) in the PSMP frame while the STA only needs to wake up to receive frames at its allocated downlink transmission time (DTT) and wake up to transmit frames at the uplink transmission time (UTT) with no clear channel assessment (CCA) executed and with network allocation vector (NAV) settings omitted, and can enter a sleep mode at other times. The PSMP is used to optimize channel access for devices that periodically receive and transmit small amounts of data and expect their communication interfaces to remain inactive, i.e., not to actively transmit or receive frames most of the time to save power.

A PSMP-scheduled STA will be informed of its DTT and UTT only after it correctly decodes the PSMP frame. If the STA does not successfully decode the PSMP frame, it possibly misses its PSMP-UTT. As stated in the protocol, if a STA misses its own PSMP-UTT due to a failure to decode the PSMP frame, no data will be transmitted during the PSMP-UTT for the STA. Once the AP detects such a condition, the AP may transmit the PSMP frame (also referred to as a PSMP recovery frame) to recover the transmission during the PSMP-UTT if the following two conditions are satisfied. Firstly, a carrier sense (CS) mechanism indicates that the medium is idle at a transmission priority interframe space (TxPIFS) slot boundary after the start of the PSMP-UTT; and secondly, the PSMP-UTT duration is longer than the total time of the PSMP recovery frame plus the priority interframe space (PIFS). The TxPIFS slot boundary is a multiple access channel (MAC) slot boundary, and can also be a transmission short interframe space (TxSIFS) slot boundary, a transmission distributed (coordination function) interframe space (TxDIFS) slot boundary, etc. These slot boundaries define time for a multiple access channel (MAC) to turn on a transmitter to satisfy different interframe space (IFS) timing on the medium after a CCA result of a previous slot time is detected. As shown in FIG. 1, the circle marker denotes a transmission priority interframe space (TxPIFS) slot boundary.

For scheduled PSMP, the STA will remain active throughout the PSMP service cycle, so a new PSMP schedule can be detected. However, for unscheduled PSMP, since the STA does not successfully decode the PSMP frame, it is uninformed about a subsequent PSMP sequence including the STA, and may enter sleep mode. In this case, the STA may miss its own PSMP-DTT and PSMP-UTT. Even if the AP transmits a PSMP recovery frame, the STA may not necessarily receive it. As a result, the PSMP-DTT and PSMP-UTT resources that the AP allocates for the STA will be wasted.

At present, an effective solution to the problems has not been proposed yet.

SUMMARY

Embodiments of the present disclosure provide a method for processing data and a wireless access point.

According to an aspect of the embodiments of the present disclosure, a method for processing data is provided. The method is applied to a wireless access point, and includes: an identification frame is transmitted to a target station, and the identification frame at least includes station identification information, and the station identification information is configured to indicate the target station; a predetermined acknowledgement frame returned by the target station is received; and a target frame is transmitted to the target station according to the predetermined acknowledgement frame, and the target frame includes a downlink transmission time and an uplink transmission time allocated to the target station.

In some embodiments, there are a plurality of target stations, and the identification frame is transmitted to the target station includes: the identification frame is transmitted to the plurality of target stations; and the predetermined acknowledgement frame returned by the target station is received includes: a plurality of predetermined acknowledgement frames synchronously returned by the plurality of target stations are received, and the plurality of target stations correspond to a plurality of predetermined acknowledgement frames one by one.

In some embodiments, the identification frame includes six fields, and a first field includes a frame type and a subframe type, a second field includes a duration, a third field includes a broadcast address, a fourth field includes an address of a wireless access point, a fifth field includes the station identification information, and a sixth field includes a frame check sequence.

In some embodiments, the predetermined acknowledgement frame includes an acknowledgement field and identification information at a tail of the acknowledgement field, and the identification information is configured to indicate the predetermined acknowledgement frame. In some embodiments, the predetermined acknowledgement frame returned by the target station is received includes: the acknowledgement field is received; and the identification information is received after a preset number of signal durations after receiving the acknowledgement field, and a duration of the identification information is one signal duration, and the signal duration is a sum of a time length occupied an orthogonal frequency division multiplexing symbol of the predetermined acknowledgement frame and a time length occupied by a guard interval of the acknowledgement frame.

According to another aspect of the embodiments of the present disclosure, a method for processing data is further provided. The method is applied to a target station, and includes: an identification frame transmitted by a wireless access point is received, and the identification frame at least includes station identification information, and the station identification information is configured to indicate the target station; and a predetermined acknowledgement frame is transmitted to the wireless access point, such that the wireless access point transmits a target frame to the target station after receiving the predetermined acknowledgement frame, and the target frame includes a downlink transmission time and an uplink transmission time allocated to the target station.

In some embodiments, and there are a plurality of target stations, the predetermined acknowledgement frame is transmitted to the wireless access point includes: predetermined acknowledgement frames are synchronously transmitted to the wireless access point by the plurality of target stations, and the plurality of target stations correspond to a plurality of predetermined acknowledgement frames one by one.

According to another aspect of the embodiments of the present disclosure, a wireless access point is provided. The wireless access point includes: one or more processors; and a memory configured to store one or more programs; and when the one or more programs are executed by the one or more processors, the one or more processors implement following actions:

an identification frame is transmitted to a target station, and the identification frame at least includes station identification information, and the station identification information is configured to indicate the target station; a predetermined acknowledgement frame returned by the target station is received; and a target frame is transmitted to the target station according to the predetermined acknowledgement frame, and the target frame includes a downlink transmission time and an uplink transmission time allocated to the target station.

BRIEF DESCRIPTION OF THE DRAWINGS

The accompanying drawings described herein serve to provide a further understanding of the present disclosure and form a part of the present disclosure, and the illustrative embodiments of the present disclosure and the description of the illustrative embodiments serve to explain the present disclosure and are not to be construed as unduly limiting the present disclosure. In the drawings.

DETAILED DESCRIPTION OF THE EMBODIMENTS

In order to make those skilled in the art better understand the solution of the present disclosure, the technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. Based on the embodiments of the present disclosure, all other embodiments acquired by those of ordinary skill in the art without making creative efforts should fall within the scope of protection of the present disclosure.

It should be noted that the terms "first", "second" and so forth, in the description and claims of the present disclosure and in the above-mentioned drawings, are used to distinguish between similar objects and not necessarily to describe a particular order or sequential order. It should be understood that the data used in this way may be interchanged where appropriate, such that the embodiments of the present disclosure described herein can be implemented in other sequences than those illustrated or described herein. In addition, the terms "comprise", "include", "have", and any variations thereof are intended to cover non-exclusive inclusions, for example, processes, methods, systems, products, or equipment that includes a series of steps or units are not necessarily limited to those explicitly listed steps or units, but may include other steps or units not explicitly listed or inherent to these processes, methods, products, or devices.

It should be understood that when an element (for example, a layer, film, region, or substrate) is described as being "on" another element, the element may be directly on the other element, or intervening elements may also be present. Furthermore, in the specification and claims, when an element is referred to as being "connected" to another element, the element may be "directly connected" to another element or "connected" to another element by a third element.

As mentioned in the background art, a transmission mechanism in the related art is likely to waste downlink transmission resources and uplink transmission resources allocated by a wireless access point to a related station. In order to solve the above problem, a method and apparatus for processing data are provided in a typical implementation of the present disclosure.

According to some embodiments of the present disclosure, a method for processing data is provided. The method may be applied to a wireless access point.

Figure 1:
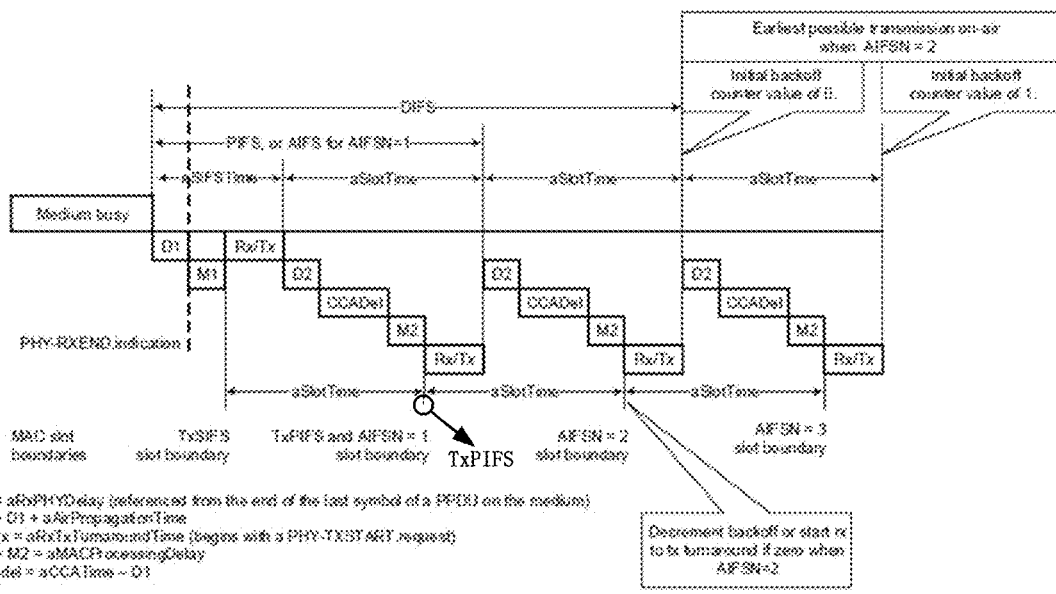
FIG. 1 is a schematic diagram of a transmission priority interframe space (TxPIFS) slot boundary according to the related art.
Figure 2:
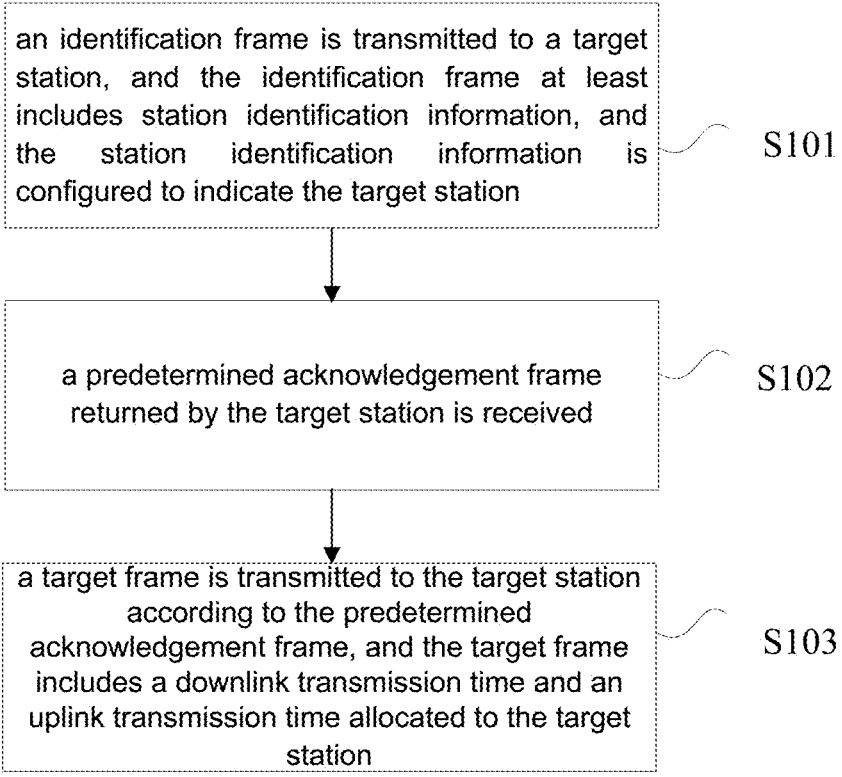
FIG. 2 is a flowchart of a method for processing data according to an embodiment of the present disclosure.

FIG. 2 is a flowchart of a method for processing data according to an embodiment of the present disclosure. As shown in FIG. 2, the method includes:

S101, an identification frame is transmitted to a target station, and the identification frame at least includes station identification information, and the station identification information is configured to indicate the target station;

Specifically, the identification frame is transmitted to the target station before the target frame transmitted to the target station;

In a specific implementation process, the target frame includes but is not limited to a power-save multi-poll (PSMP) frame, and the identification frame includes, but is not limited to, a PSMP poll frame. Alternatively, the target frame, the identification frame, etc. may be determined according to a transmission protocol supported by both the target station and the wireless access point, which is not limited herein.

S102, a predetermined acknowledgement frame returned by the target station is received;

Specifically, the predetermined acknowledgement frame is received, in a case of the target station receives the identification frame and the target station is the station designated by the target frame;

S103, a target frame is transmitted to the target station according to the predetermined acknowledgement frame, and the target frame includes a downlink transmission time and an uplink transmission time allocated to the target station.

The downlink transmission time refers to a time required for a signal to be transmitted from a base station (or an access point) to a user equipment (such as a mobile phone or a computer) in a wireless communication system;

Uplink Transmission Time refers to a time required for a mobile device (such as a mobile phone or a tablet computer) to transmit data to a base station or an access point in a communication system. Uplink refers to a data transmission path from a user equipment to a network device.

The method for processing data is applied to a wireless access point. First, an identification frame at least including station identification information is transmitted before transmitting a target frame to a target station, and the station identification information is configured to indicate a station designated by the target frame. Then, a predetermined acknowledgement frame returned by the target station is received in a case of the target station receives the identification frame and the target station is the station designated by the target frame. Finally, it is determined to transmit the target frame to the target station according to the predetermined acknowledgement frame, where the target frame includes a downlink transmission time and an uplink transmission time allocated to the target station. In the method, in a case of the target station designated by the target frame receives the identification frame, the predetermined acknowledgement frame returned by the target station is received, and then it is determined to transmit the target frame to the target station according to the predetermined acknowledgement frame, and no scheduling is performed on a station that does not reply the acknowledgement, such that it is ensured that downlink transmission resources and uplink transmission resources that the access point (AP) will allocate to the station (STA) are not wasted, and further the technical problem that a transmission mechanism in the related art is likely to waste a downlink transmission resource and an uplink transmission resource allocated by a wireless access point to a related station is solved.

It should be noted that the data processing method is not only applicable to the PSMP mechanism, but also applicable to all uplink multi-user acknowledgement manners before the 11ax protocol, for example, the 11ax protocol has an orthogonal frequency division multiple access (OFDMA)/multi-user multiple input multiple output (MU-MIMO) technology, and the uplink multi-user transmission problem can be solved by using the data processing method.

It should be noted that, the steps shown in the flowchart of the drawings can be executed in a computer system such as a set of computer executable instructions, and although the logic order is shown in the flowchart, in some cases, the shown or described steps can be executed in an order different from that described here.

In some embodiments, there are a plurality of target stations, and the identification frame is transmitted to the target station includes: the identification frame is transmitted to the plurality of target stations; and the predetermined acknowledgement frame returned by the target station is received includes: a plurality of predetermined acknowledgement frames synchronously returned by the plurality of target stations are received, and the plurality of target stations correspond to a plurality of predetermined acknowledgement frames one by one. Specifically, a plurality of target stations synchronously return ACK frames, and it is only distinguished, by means of a tail segment (Signature), which target station specifically returns the ACK frames. The entire flow can be considered to be almost parallel, thereby greatly saving the overheads of serial recovery of all target stations.

In order to include some brief STA information in the identification frame and further to indicate which STAs the target frame is intended for, in embodiments of the present disclosure, the identification frame includes six fields, and a first field includes a frame type and a subframe type, a second field includes a duration, a third field includes a broadcast address, a fourth field includes an address of a wireless access point, a fifth field includes the station identification information, and a sixth field includes a frame check sequence.

The frame type indicates a general frame type, and is generally used to differentiate data transmission, control information and a management layer.

The subframe type further details the specific functions of the frame, and each type of frame has several subframe types for describing the specific use of the type of frame.

Figure 3:
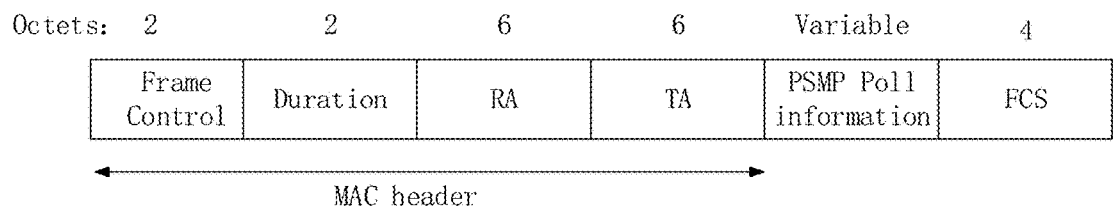
FIG. 3 is a schematic diagram of a format of a power-save multi-poll (PSMP) poll frame according to an embodiment of the present disclosure.

Some common frame types and frame sub-types are listed as follows:

1. Management Frame (MF): The MF is configured to establish, maintain, and terminate a connection, and exchange control information, and a subframe type of the management frame includes:
    Beacon frame BF
    Probe Request Frame PRF
    Probe Response Frame PRF
    Authentication Frame AF
    De-Authentication Frame DF
    Association Request/Response Frame ARF
    Reassociation Request/Response Frame RRF
    Probe Request/Response Frame DF
2. Control frame CF: CF is used for controlling and managing the access and data transmission of a wireless channel, and the frame types of the control frame comprise:
    Request to Send Data Frame RTSF
    Clear to send data frame CTSF
    Acknowledgement of receipt of the data frame ACKF
    End or End and acknowledge channel idle frame CF-End/CF-End+CF-Ack Frame
3. Data Frame DF: DF is used for transmitting data, and the subframe type of the data frame includes: Data, Null, QoS data, QoS Null;

In some specific embodiments of the present disclosure, the identification frame includes, but is not limited to, a PSMP Poll frame. In a case of the target frame is a PSMP frame and the identification frame is a PSMP Poll frame, a schematic diagram of a format of the PSMP Poll frame is as shown in FIG. 3. The frame type and the subtype in the first field of Frame control field indicate a PSMP poll frame. The second field of Duration is duration. The third field of Receiving address (RA) is a broadcast address. The fourth field of Transmitting address (TA) is an AP address. The fifth field of PSMP Poll information field includes one or more pieces of station identification information, and each piece of station identification information is 2 bytes long. The station identification information is the association identifier (AID) information of the STA, indicating the STA to be scheduled by the AP in the PSMP frame.

Specifically, the function of the second field Duration in the PSMP Poll frame is to protect subsequent transmission, including an IFS time slot+an acknowledgement frame replied by a subsequent target site, etc.;

Specifically, the function of the "duration" field is as follows:
1. guaranteeing the reliability of data transmission: by setting an appropriate duration value, ensuring that a device sending a PS-Poll will not miss any data packet when receiving data.
2. controlling the wake-up time of the device: by reasonably setting the duration value, the wake-up time of the device in a low power consumption state can be controlled, thereby saving energy.
3. Avoiding conflicts: in a multi-device environment, a suitable duration value can reduce conflicts between devices, thereby improving the overall network performance.

In a PSMP Poll frame, an RA (Receiving Address) field is used to specify an address of a receiver, and when the RA field is set to a broadcast address, it means that the Poll frame is sent to all nodes in a network. The broadcast address is a special address for all devices on the network, in which case the poll frame will be identified by all the nodes receiving it, not just a specific node.

The RA field using a broadcast address has the following advantages:
1. Energy saving: by sending a broadcast Poll frame, sending the Poll frame to each node separately can be avoided, thereby saving energy.
2. Efficient network management: broadcasting a Poll frame may be used to quickly wake up or notify all nodes in a network, thereby improving the management efficiency of the network.
3. Reduced collision: broadcasting Poll frames may reduce collisions between nodes, since all nodes receive the same information, avoiding repeated sending.
4. Simplifying communication: in some scenarios, using a broadcast address can simplify a communication process between nodes, especially in the case that same information needs to be sent to a plurality of nodes at the same time.

The main meaning of the TA (transmitting address) field in the PSMP Poll frame is as follows:
1. identifying a sender: a TA field is used for identifying an address of a device or base station sending a Poll frame, which helps a receiver (usually a mobile user or another device) to identify the sender and perform corresponding processing and response when needed.
2. Routing and Addressing: in wireless communication systems, TA fields may be used for routing and addressing to ensure that packets can be correctly transmitted from a sender to a receiver. This is critical to achieving efficient data transmission in complex network topologies.
3. Network management and control: TA fields may also be used for network management and control, for example when allocating resources, scheduling communications, or performing fault diagnostics. Through the analysis of the TA field, the network administrator can better understand the communication state and performance of each device in the network.
4. Security and authentication: in some cases, the TA field can also be used for security and authentication purposes. By verifying the address of the sender, the security of communication can be ensured, and unauthorized devices can be prevented from accessing the network.
5. Load and traffic management: a TA field can also be used for load and traffic management. By means of statistics and analysis of a sender address, communication traffic distribution in a network can be learned, thereby performing reasonable resource allocation and scheduling.

Figure 4:
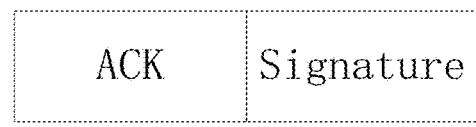
FIG. 4 is a schematic diagram of a format of a PSMP acknowledgement (ACK) according to an embodiment of the present disclosure.

In order to distinguish whether each STA transmits an acknowledgement and reduce overhead, that is, to minimize a required time, the predetermined acknowledgement frame includes an acknowledgement field and identification information at a tail of the acknowledgement field, and the identification information is configured to indicate the predetermined acknowledgement frame. In some other embodiments of the present disclosure, the predetermined acknowledgement frame may be in a PSMP acknowledgement (ACK) format. As shown in FIG. 4, the PSMP ACK format includes an acknowledgement (ACK) frame and a PSMP ACK signature at the tail of the ACK frame. The PSMP ACK signature is the identification information. The PSMP ACK signature may be a unique identifier used to identify the tail of the PSMP ACK frame, for example, an ASCII value corresponding to a certain symbol.

In some other embodiments of the present disclosure, the predetermined acknowledgement frame returned by the target station is received includes: the acknowledgement field is received; and the identification information is received after a preset number of signal durations after receiving the acknowledgement field, and a duration of the identification information is one signal duration, and the signal duration is a sum of a time length occupied an orthogonal frequency division multiplexing symbol of the predetermined acknowledgement frame and a time length occupied by a guard interval of the acknowledgement frame.

Figure 5:
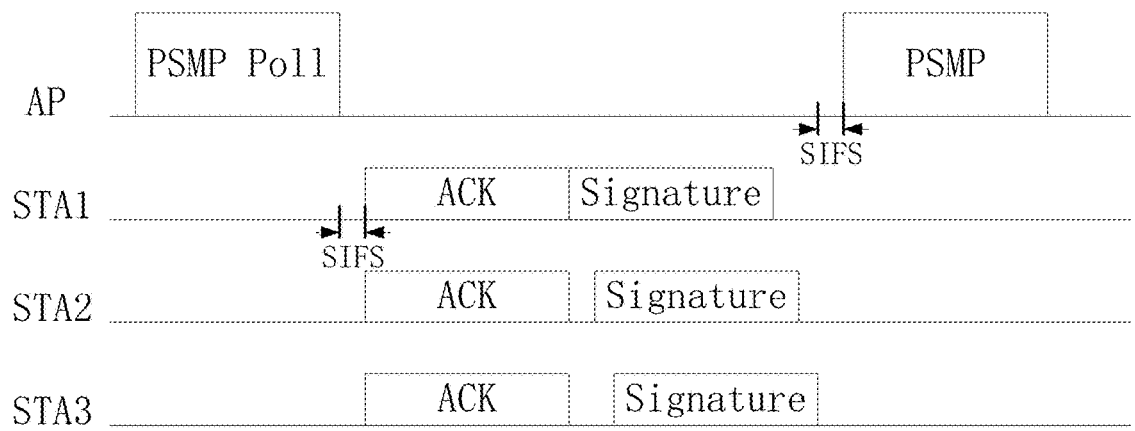
FIG. 5 is a schematic diagram of receiving a PSMP ACK signature according to an embodiment of the present disclosure.

In some specific embodiments of the present disclosure, the PSMP poll frame transmitted by the access point (AP) indicates that N STAs participate in this PSMP scheduling. When an AID position of the STA in the PSMP poll frame is the nth, the AP receives the predetermined acknowledgement frame returned by the target station. As shown in FIG. 5, in the tail of the ACK frame, power-save multi-poll acknowledgement identification content (PSMP ACK signature) with a length of one signal time is transmitted following (n-1) signal time, and the signal time is a sum of an orthogonal frequency division multiplexing symbol time and a guard interval time of the ACK frame. Moreover, the AP determines whether the corresponding STA receives a PSMP Poll ACK frame according to whether the PSMP ACK signature is decoded in the nth signal time, and then reasonably allocates DTT resources and UTT resources according to these pieces of information. No resources are allocated to the STAs that do not receive the PSMP Poll ACK frame, such that resource waste is avoided. PSMP poll frame transmission and subsequent STA response require some overhead, but the overhead is negligible compared to the DTT and UTT allocated for each STA in the PSMP frame.

In order to further avoid resource waste, in some embodiments of the present disclosure, after the step of transmitting an identification frame, the method further includes: receiving the predetermined acknowledgement frame returned by the target station is executed no operation in a case of the target station does not receive the identification frame or when the target station receives the identification frame and the target station is not the station designated by the target frame.

According to some other embodiments of the present disclosure, a method for processing data is provided. The method may be applied to a target station.

Figure 6:
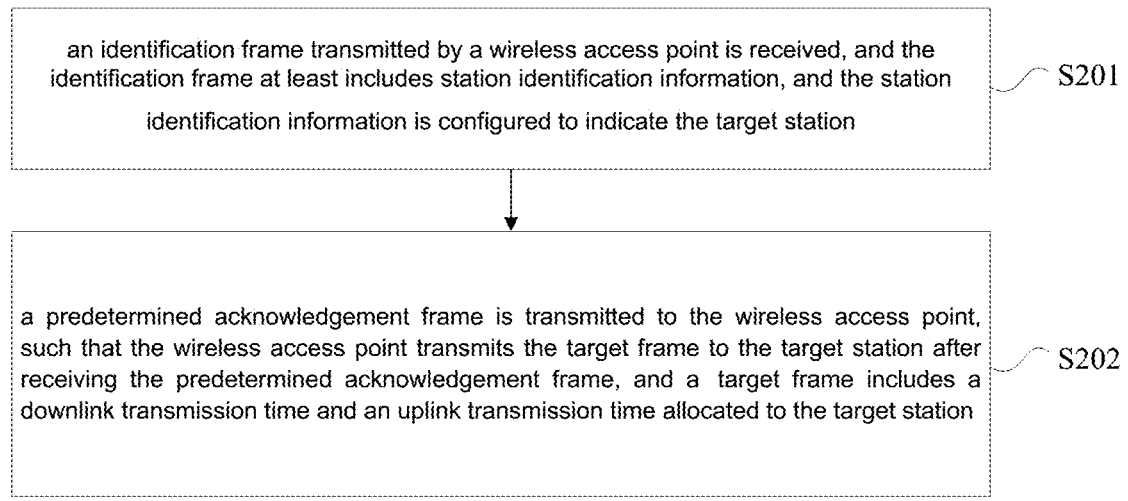
FIG. 6 is a flowchart of a method for processing data according to some other embodiments of the present disclosure.

FIG. 6 is a flowchart of a method for processing data according to some other embodiments of the present disclosure. As shown in FIG. 6, the method includes:

S201, an identification frame transmitted by a wireless access point is received, and the identification frame at least includes station identification information, and the station identification information is configured to indicate the target station;

S202, a predetermined acknowledgement frame is transmitted to the wireless access point, such that the wireless access point transmits a target frame to the target station after receiving the predetermined acknowledgement frame, and the target frame includes a downlink transmission time and an uplink transmission time allocated to the target station.

The above method for processing data is applied to a target station. First, an identification frame at least including station identification information and transmitted by a wireless access point is received, where the station identification information is configured to indicate a station designated by a target frame. Then, a predetermined acknowledgement frame is transmitted to the wireless access point when a target station receives the identification frame and the target station is the station designated by the target frame, such that the wireless access point transmits the target frame to the target station. The target frame includes a downlink transmission time and an uplink transmission time allocated to the target station. In the method, when the target station receives the identification frame and the target station is the station designated by the target frame, the predetermined acknowledgement frame is transmitted to the wireless access point, and no scheduling is performed on a station that does not reply the acknowledgement, such that it is ensured that downlink transmission resources and uplink transmission resources that the AP will allocate to the STA are not wasted, and further the technical problem that a transmission mechanism in the related art is likely to waste a downlink transmission resource and an uplink transmission resource allocated by a wireless access point to a related station is solved.

In some embodiments, and there are a plurality of target stations, the predetermined acknowledgement frame is transmitted to the wireless access point includes: predetermined acknowledgement frames are synchronously transmitted to the wireless access point by the plurality of target stations, and the plurality of target stations correspond to a plurality of predetermined acknowledgement frames one by one. Specifically, a plurality of target stations synchronously return ACK frames, and it is only distinguished, by means of a tail segment, which target station specifically returns the ACK frames. The entire flow can be considered to be almost parallel, thereby greatly saving the overheads of serial recovery of all target stations.

An embodiment of the present disclosure further provides a wireless access point, The wireless access point includes: one or more processors; and a memory configured to store one or more programs; and when the one or more programs are executed by the one or more processors, the one or more processors implement following actions:

an identification frame is transmitted to a target station, and the identification frame at least includes station identification information, and the station identification information is configured to indicate the target station; a predetermined acknowledgement frame returned by the target station is received; and a target frame is transmitted to the target station according to the predetermined acknowledgement frame, and the target frame includes a downlink transmission time and an uplink transmission time allocated to the target station.

In some embodiments, there are a plurality of target stations, and the identification frame is transmitted to the target station includes: the identification frame is transmitted to the plurality of target stations; and the predetermined acknowledgement frame returned by the target station is received includes: a plurality of predetermined acknowledgement frames synchronously returned by the plurality of target stations are received, and the plurality of target stations correspond to a plurality of predetermined acknowledgement frames one by one.

In some embodiments, the identification frame includes six fields, and a first field includes a frame type and a subframe type, a second field includes a duration, a third field includes a broadcast address, a fourth field includes an address of a wireless access point, a fifth field includes the station identification information, and a sixth field includes a frame check sequence.

In some embodiments, the predetermined acknowledgement frame includes an acknowledgement field and identification information at a tail of the acknowledgement field, and the identification information is configured to indicate the predetermined acknowledgement frame. In some embodiments, the predetermined acknowledgement frame returned by the target station is received includes: the acknowledgement field is received; and the identification information is received after a preset number of signal durations after receiving the acknowledgement field, and a duration of the identification information is one signal duration, and the signal duration is a sum of a time length occupied an orthogonal frequency division multiplexing symbol of the predetermined acknowledgement frame and a time length occupied by a guard interval of the acknowledgement frame.

An embodiment of the present disclosure further provides an apparatus for processing data. The apparatus is applied to a wireless access point. It should be noted that the apparatus for processing data in the embodiments of the present disclosure may be used to execute the method for processing data provided in the embodiments of the present disclosure. The apparatus for processing data provided in the embodiment of the present disclosure is described below.

Figure 7:
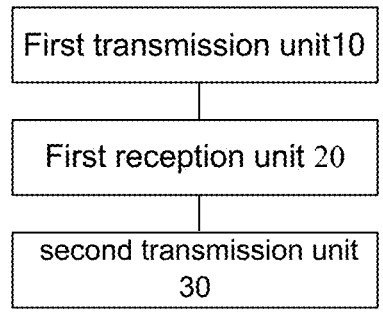
FIG. 7 is a schematic diagram of an apparatus for processing data according to an embodiment of the present disclosure.

FIG. 7 is a schematic diagram of an apparatus for processing data according to an embodiment of the present disclosure. As shown in FIG. 7, the apparatus includes a first transmission unit, a first reception unit and a second transmission unit.

The first transmission unit 10 is configured to transmit an identification frame to a target station, and the identification frame at least includes station identification information, and the station identification information is configured to indicate the target station.

The first reception unit 20 is configured to receive a predetermined acknowledgement frame returned by the target station.

The second transmission unit 30 is configured to transmit a target frame to the target station according to the predetermined acknowledgement frame, and the target frame includes a downlink transmission time and an uplink transmission time allocated to the target station.

The apparatus for processing data is applied to a wireless access point. An identification frame at least including station identification information is transmitted by the first transmission unit 10 before transmitting a target frame to a target station, and the station identification information is configured to indicate a station designated by the target frame. Then, a predetermined acknowledgement frame returned by the target station is received by the first reception unit 20 when the target station receives the identification frame and the target station is the station designated by the target frame. Finally, the second transmission unit 30 determines to transmit the target frame to the target station according to the predetermined acknowledgement frame, and the target frame includes a downlink transmission time and an uplink transmission time allocated to the target station. In the apparatus, when the target station designated by the target frame receives the identification frame, the predetermined acknowledgement frame returned by the target station is received, and then it is determined to transmit the target frame to the target station according to the predetermined acknowledgement frame, and no scheduling is performed on a station that does not reply the acknowledgement, such that it is ensured that downlink transmission resources and uplink transmission resources that the AP will allocate to the STA are not wasted, and further the technical problem that a transmission mechanism in the related art is likely to waste a downlink transmission resource and an uplink transmission resource allocated by a wireless access point to a related station is solved.

In some embodiments, the first transmission unit is further configured to transmit the identification frame to the multiple target stations; the first reception unit is further configured to receive a plurality of predetermined acknowledgement frames synchronously returned by the plurality of target stations, and the plurality of target stations correspond to a plurality of predetermined acknowledgement frames one by one. Specifically, a plurality of target stations synchronously return ACK frames, and it is only distinguished, by means of a tail segment, which target station specifically returns the ACK frames. The entire flow can be considered to be almost parallel, thereby greatly saving the overheads of serial recovery of all target stations.

In order to include some brief STA information in the PSMP poll frame and further to indicate which STAs the PSMP frame is intended for, in an embodiment of the present disclosure, the identification frame includes six fields, and a first field includes a frame type and a subframe type, a second field includes a duration, a third field includes a broadcast address, a fourth field includes an address of a wireless access point, a fifth field includes the station identification information, and a sixth field includes a frame check sequence.

In some specific embodiments of the present disclosure, a format of the PSMP poll frame is as shown in FIG. 3. The frame type and the subtype in the first field of Frame control field indicate a PSMP poll frame. The second field of Duration is duration. The third field of RA is a broadcast address. The fourth field of TA is an AP address. The fifth field of PSMP Poll information field includes one or more pieces of station identification information, and each station identifier is 2 bytes long. The station identification information is the association identifier (AID) information of the STA, indicating the STA to be scheduled by the AP in the PSMP frame.

In order to distinguish whether each STA transmits an acknowledgement and reduce overhead, that is, to minimize a required time, the predetermined acknowledgement frame includes an acknowledgement field and identification information at a tail of the acknowledgement field, and the identification information is configured to indicate the predetermined acknowledgement frame. In some other embodiments of the present disclosure, the predetermined acknowledgement frame is in a PSMP ACK format. As shown in FIG. 4, the PSMP ACK format includes an ACK frame and a PSMP ACK signature at the tail of the ACK frame. The PSMP ACK signature is the identification information. The PSMP ACK signature may be a unique identifier used to identify the tail of the PSMP ACK frame, for example, an ASCII value corresponding to a certain symbol.

In some other embodiments of the present disclosure, the first reception unit includes:
  a first reception sub-unit is configured to receive the acknowledgement field; and
  a second reception sub-unit is configured to receive the identification information after a preset number of signal durations after receiving the acknowledgement field, and a duration of the identification information is one signal duration, and the signal duration is a sum of a time length occupied an orthogonal frequency division multiplexing symbol of the predetermined acknowledgement frame and a time length occupied by a guard interval of the acknowledgement frame.

In some specific embodiments of the present disclosure, the PSMP poll frame transmitted by the AP indicates that N STAs participate in this PSMP scheduling. When an AID position of the STA in the PSMP poll frame is the nth, the AP receives the predetermined acknowledgement frame returned by the target station. As shown in FIG. 5, in the tail of the ACK frame, a PSMP ACK signature with a length of one signal time is transmitted following (n-1) signal time, and the signal time is a sum of an orthogonal frequency division multiplexing symbol time and a guard interval time of the ACK frame. Moreover, the AP determines whether the corresponding STA replies to a PSMP Poll ACK frame according to whether the PSMP ACK signature is decoded in the nth signal time, and then reasonably allocates DTT resources and UTT resources according to these pieces of information. No resources are allocated to the STAs that do not reply to the PSMP ACK frame, such that resource waste is avoided. PSMP poll frame transmission and subsequent STA response require some overhead, but the overhead is negligible compared to the DTT and UTT allocated for each STA in the PSMP frame.

In order to further avoid resource waste, in some other embodiments of the present disclosure, the apparatus further includes a third reception unit. The third reception unit is configured to execute no operation of receiving the predetermined acknowledgement frame returned by the target station in a case of the target station does not receive the identification frame or when the target station receives the identification frame and the target station is not the station designated by the target frame, after transmitting the identification frame.

An embodiment of the present disclosure further provides an apparatus for processing data. The apparatus is applied to a station. It should be noted that the apparatus for processing data in the embodiments of the present disclosure may be used to execute the method for processing data provided in the embodiments of the present disclosure. The apparatus for processing data provided in the embodiment of the present disclosure is described below.

Figure 8:
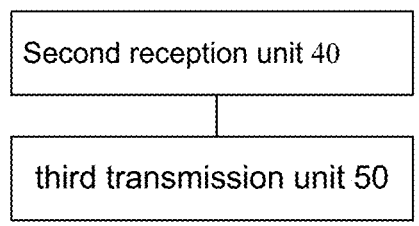
FIG. 8 is a schematic diagram of an apparatus for processing data according to some other embodiments of the present disclosure.

FIG. 8 is a schematic diagram of an apparatus for processing data according to some other embodiments of the present disclosure. As shown in FIG. 8, the apparatus includes:

- a second reception unit 40 configured to receive an identification frame transmitted by a wireless access point, and the identification frame at least includes station identification information, and the station identification information is configured to indicate the target station;
- a third transmission unit 50 configured to transmit a predetermined acknowledgement frame to the wireless access point, such that the wireless access point transmits the target frame to the target station after receiving the predetermined acknowledgement frame, and the target frame includes a downlink transmission time and an uplink transmission time allocated to the target station.

The above apparatus for processing data is applied to a station. First, an identification frame at least including station identification information and transmitted by a wireless access point is received by the second reception unit 40. The station identification information is configured to indicate the target station designated by a target frame. Then, a predetermined acknowledgement frame is transmitted to the wireless access point by the third transmission unit 50 when a target station receives the identification frame and the target station is the station designated by the target frame, such that the wireless access point transmits the target frame to the target station. The target frame includes a downlink transmission time and an uplink transmission time allocated to the target station. In the apparatus, when the target station receives the identification frame and the target station is the station designated by the target frame, the predetermined acknowledgement frame is transmitted to the wireless access point, and no scheduling is performed on a station that does not reply the acknowledgement, such that it is ensured that downlink transmission resources and uplink transmission resources that the AP will allocate to the STA are not wasted, and further the technical problem that a transmission mechanism in the related art is likely to waste a downlink transmission resource and an uplink transmission resource allocated by a wireless access point to a related station is solved.

In some embodiments, the third sending unit is further used for a plurality of target stations to synchronously send the predetermined acknowledgement frames to the wireless access point, in which the target stations correspond to the predetermined acknowledgement frames on a one-to-one basis. Specifically, a plurality of target stations synchronously return ACK frames, and it is only distinguished, by means of a tail segment, which target station specifically returns the ACK frames. The entire flow can be considered to be almost parallel, thereby greatly saving the overheads of serial recovery of all target stations.

The apparatus for processing data includes a processor and a memory. The first transmission unit, the first reception unit, the determination unit, the second reception unit, and the second transmission unit are all stored in the memory as program units, and the processor executes the program units stored in the memory, to implement corresponding functions.

Further, the processor includes a kernel. The kernel retrieves the corresponding program unit from the memory. One or more kernels may be set. The problem that a transmission mechanism in the related art is likely to waste a downlink transmission resource and an uplink transmission resource allocated by a wireless access point to a related station is solved by adjusting kernel parameters.

The memory may include a non-permanent memory in a computer-readable medium, a random access memory (RAM), a non-volatile memory, or a form of a random access memory (RAM) and a non-volatile memory, such as a read-only memory (ROM) or a flash RAM. The memory includes at least one memory chip.

An embodiment of the present disclosure provides a computer-readable storage medium, storing a program. When executed by a processor, the program implements the above method for processing data.

An embodiment of the present disclosure provides a processor. The processor is configured to operate a program. The program executes the above method for processing data when running.

An embodiment of the present disclosure provides a device. The device includes a processor, a memory, and a program stored on the memory and executable by the processor. The processor implements at least the following steps when executing the program:

- S101, an identification frame is transmitted to a target station, and the identification frame at least includes station identification information, and the station identification information is configured to indicate the target station;
- S102, a predetermined acknowledgement frame returned by the target station is received;
- S103, a target frame is transmitted to the target station according to the predetermined acknowledgement frame, and the target frame includes a downlink transmission time and an uplink transmission time allocated to the target station.

Alternatively, when executing the program, the processor implements at least the following steps:

- S201, an identification frame transmitted by a wireless access point is received, and the identification frame at least includes station identification information, and the station identification information is configured to indicate the target station;
- S202, a predetermined acknowledgement frame is transmitted to the wireless access point, such that the wireless access point transmits a target frame to the target station after receiving the predetermined acknowledgement frame, and the target frame includes a downlink transmission time and an uplink transmission time allocated to the target station.

The device herein may be a server, a personal computer (PC), a PAD, a mobile phone, etc.

The present disclosure further provides a computer program product. When executed on a data processing device, the computer program product is adapted to execute a program initialized with at least the following method steps:

- S101, an identification frame is transmitted to a target station, and the identification frame at least includes station identification information, and the station identification information is configured to indicate the target station;
- S102, a predetermined acknowledgement frame returned by the target station is received;
- S103, a target frame is transmitted to the target station according to the predetermined acknowledgement frame, and the target frame includes a downlink transmission time and an uplink transmission time allocated to the target station.

Alternatively, the computer program product executes a program initialized with at least the following method steps:

S201, an identification frame transmitted by a wireless access point is received, and the identification frame at least includes station identification information, and the station identification information is configured to indicate the target station;

S202, a predetermined acknowledgement frame is transmitted to the wireless access point, such that the wireless access point transmits a target frame to the target station after receiving the predetermined acknowledgement frame, and the target frame includes a downlink transmission time and an uplink transmission time allocated to the target station.

The serial numbers of the embodiments of the present disclosure are only used for description and does not represent the merits of the embodiments.

In the above embodiments of the present disclosure, the descriptions of all embodiments are emphasized on their respective aspects, and for undetailed parts of some embodiments, reference may be made to the associated descriptions of other embodiments.

In several embodiments provided in the present disclosure, it should be understood that the disclosed technology may be implemented in other ways. The apparatus embodiments described above are merely illustrative, for example, a division of the units may be a division of logical functions, and in practice there may be additional ways of division, for example, a plurality of units or assemblies may be combined or integrated into another system, or some features may be neglected or not executed. Moreover, mutual coupling or direct coupling or communication connection as shown or discussed may be indirect coupling or communication connection by means of some interfaces, units or modules, and may be in an electrical form or a different form.

The units illustrated as separate components may be physically separated or not, and the components shown as units may be physical units or not, that is, may be located in one place, or may also be distributed over a plurality of units. Some or all of the units may be selected according to actual needs to achieve the objective of the solution of the embodiment.

Moreover, each functional unit in each embodiment of the present disclosure may be integrated in one processing unit, or each unit may exist separately and physically, or two or more units may be integrated in one unit. The above integrated units may be implemented in a form of hardware and may also be implemented in a form of software functional unit.

The above integrated units may be stored in a computer readable storage medium if implemented in the form of a software functional unit and sold or used as an independent product. Based on such understanding, the technical solution of the present disclosure may be embodied in the form of a software product in essence or a part contributing to the related art or all or part of the technical solution, and the computer software product is stored in a storage medium and includes a plurality of instructions for making a computer device (which may be a personal computer, a server, a network device, etc.) execute all or some of the steps of the methods described in the various embodiments of the present disclosure. The foregoing storage medium includes a USB flash disk, a read-only memory (ROM), a random access memory (RAM), a mobile hard disk, a magnetic disk, an optical disk and other media capable of storing program codes.

From the above description, it may be seen that the above embodiments of the present disclosure achieve the following technical effects:

1) The method for processing data in the present disclosure is applied to a wireless access point. First, an identification frame at least including station identification information is transmitted before a target frame is transmitted to a target station, and the station identification information is configured to indicate a station designated by the target frame. Then, a predetermined acknowledgement frame returned by the target station is received when the target station receives the identification frame and the target station is the station designated by the target frame. Finally, it is determined to transmit the target frame to the target station according to the predetermined acknowledgement frame, where the target frame includes a downlink transmission time and an uplink transmission time allocated to the target station. In the method, when the target station designated by the target frame receives the identification frame, the predetermined acknowledgement frame returned by the target station is received, and then it is determined to transmit the target frame to the target station according to the predetermined acknowledgement frame, and no scheduling is performed on a station that does not reply the acknowledgement, such that it is ensured that downlink transmission resources and uplink transmission resources that the access point (AP) will allocate to the station (STA) are not wasted, and further the technical problem that a transmission mechanism in the related art is likely to waste a downlink transmission resource and an uplink transmission resource allocated by a wireless access point to a related station is solved.

2) The above method for processing data in the present disclosure is applied to a station. First, an identification frame at least including station identification information and transmitted by a wireless access point is received, where the station identification information is configured to indicate a station designated by a target frame. Then, a predetermined acknowledgement frame is transmitted to the wireless access point when a target station receives the identification frame and the target station is the station designated by the target frame, such that the wireless access point transmits the target frame to the target station. The target frame includes a downlink transmission time and an uplink transmission time allocated to the target station. In the method, when the target station receives the identification frame and the target station is the station designated by the target frame, the predetermined acknowledgement frame is transmitted to the wireless access point, and no scheduling is performed on a station that does not reply the acknowledgement, such that it is ensured that downlink transmission resources and uplink transmission resources that the AP will allocate to the STA are not wasted, and further the technical problem that a transmission mechanism in the related art is likely to waste a downlink transmission resource and an uplink transmission resource allocated by a wireless access point to a related station is solved.

3) The apparatus for processing data in the present disclosure is applied to a wireless access point. An identification frame at least including station identification information is transmitted by the first transmission unit before a target frame is transmitted to a target station, and the station identification information is configured to indicate a station designated by the target frame. Then, a predetermined acknowledgement frame returned by the target station is received by the first reception unit when the target station receives the identification frame and the target station is the station designated by the target frame. Finally, the determination unit determines to transmit the target frame to the target station according to the predetermined acknowledgement frame, where the target frame includes a downlink transmission time and an uplink transmission time allocated to the target station. In the apparatus, when the target station designated by the target frame receives the identification frame, the predetermined acknowledgement frame returned by the target station is received, and then it is determined to transmit the target frame to the target station according to the predetermined acknowledgement frame, and no scheduling is performed on a station that does not reply the acknowledgement, such that it is ensured that downlink transmission resources and uplink transmission resources that the AP will allocate to the STA are not wasted, and further the technical problem that a transmission mechanism in the related art is likely to waste a downlink transmission resource and an uplink transmission resource allocated by a wireless access point to a related station is solved.

4) The above apparatus for processing data in the present disclosure is applied to a station. First, an identification frame at least including station identification information and transmitted by a wireless access point is received by the second reception unit 40. The station identification information is configured to indicate a station designated by a target frame. Then, a predetermined acknowledgement frame is transmitted to the wireless access point by the second transmission unit when a target station receives the identification frame and the target station is the station designated by the target frame, such that the wireless access point transmits the target frame to the target station. The target frame includes a downlink transmission time and an uplink transmission time allocated to the target station. In the apparatus, when the target station receives the identification frame and the target station is the station designated by the target frame, the predetermined acknowledgement frame is transmitted to the wireless access point, and no scheduling is performed on a station that does not reply the acknowledgement, such that it is ensured that downlink transmission resources and uplink transmission resources that the AP will allocate to the STA are not wasted, and further the technical problem that a transmission mechanism in the related art is likely to waste a downlink transmission resource and an uplink transmission resource allocated by a wireless access point to a related station is solved.

The above implementations are merely preferred implementations of the present disclosure. It should be noted that several improvements and modifications can also be made by those of ordinary skill in the art without departing from the principles of the present disclosure and should also be considered to fall within the scope of protection of the present disclosure.

What is claimed is:

1. A method for processing data, applied to a wireless access point, and comprising:
   transmitting an identification frame to a target station, wherein the identification frame at least comprises station identification information, and the station identification information is configured to indicate the target station;
   receiving a predetermined acknowledgement frame returned by the target station; and
   transmitting a target frame to the target station according to the predetermined acknowledgement frame, wherein the target frame comprises a downlink transmission time and an uplink transmission time allocated to the target station;
   wherein the predetermined acknowledgement frame comprises an acknowledgement field and identification information at a tail of the acknowledgement field, wherein the identification information is configured to indicate the predetermined acknowledgement frame;
   wherein receiving the predetermined acknowledgement frame returned by the target station comprises:
   receiving the acknowledgement field; and
   receiving the identification information after a preset number of signal durations after receiving the acknowledgement field, wherein a duration of the identification information is one signal duration, and the signal duration is a sum of a time length occupied an orthogonal frequency division multiplexing symbol of the predetermined acknowledgement frame and a time length occupied by a guard interval of the acknowledgement frame.

2. The method for processing data according to claim 1, wherein there are a plurality of target stations,
   wherein transmitting the identification frame to the target station comprises: transmitting the identification frame to the plurality of target stations;
   wherein receiving the predetermined acknowledgement frame returned by the target station comprises: receiving a plurality of predetermined acknowledgement frames synchronously returned by the plurality of target stations, wherein the plurality of target stations correspond to a plurality of predetermined acknowledgement frames one by one.

3. The method for processing data according to claim 1, wherein the identification frame comprises six fields, wherein a first field comprises a frame type and a subframe type, a second field comprises a duration, a third field comprises a broadcast address, a fourth field comprises an address of a wireless access point, a fifth field comprises the station identification information, and a sixth field comprises a frame check sequence.

4. A method for processing data, applied to a target station, and comprising:
   receiving an identification frame transmitted by a wireless access point, wherein the identification frame at least comprises station identification information, and the station identification information is configured to indicate the target station; and
   transmitting a predetermined acknowledgement frame to the wireless access point, such that the wireless access point transmits a target frame to the target station after receiving the predetermined acknowledgement frame, wherein the target frame comprises a downlink transmission time and an uplink transmission time allocated to the target station;
   wherein the predetermined acknowledgement frame comprises an acknowledgement field and identification information at a tail of the acknowledgement field, wherein the identification information is configured to indicate the predetermined acknowledgement frame;
   wherein the transmitting the predetermined acknowledgement frame to the wireless access point, such that the wireless access point receives the predetermined acknowledgement frame, comprises:

transmitting the predetermined acknowledgement frame to the wireless access point, such that the wireless access point receives the acknowledgement field; and receives the identification information after a preset number of signal durations after receiving the acknowledgement field, wherein a duration of the identification information is one signal duration, and the signal duration is a sum of a time length occupied an orthogonal frequency division multiplexing symbol of the predetermined acknowledgement frame and a time length occupied by a guard interval of the acknowledgement frame.

5. The method according to claim 4, wherein there are a plurality of target stations, wherein transmitting the predetermined acknowledgement frame to the wireless access point comprises: the plurality of target stations synchronously transmitting the predetermined acknowledgement frame to the wireless access point, wherein the plurality of target stations correspond to a plurality of predetermined acknowledgement frames one by one.

6. A wireless access point, comprising:
one or more processors; and
a memory configured to store one or more programs; wherein
when the one or more programs are executed by the one or more processors, the one or more processors implement following actions:
transmitting an identification frame to a target station, wherein the identification frame at least comprises station identification information, and the station identification information is configured to indicate the target station;
receiving a predetermined acknowledgement frame returned by the target station; and
transmitting a target frame to the target station according to the predetermined acknowledgement frame, wherein the target frame comprises a downlink transmission time and an uplink transmission time allocated to the target station;
wherein the predetermined acknowledgement frame comprises an acknowledgement field and identification information at a tail of the acknowledgement field, wherein the identification information is configured to indicate the predetermined acknowledgement frame;
wherein receiving the predetermined acknowledgement frame returned by the target station comprises:
receiving the acknowledgement field; and
receiving the identification information after a preset number of signal durations after receiving the acknowledgement field, wherein a duration of the identification information is one signal duration, and the signal duration is a sum of a time length occupied an orthogonal frequency division multiplexing symbol of the predetermined acknowledgement frame and a time length occupied by a guard interval of the acknowledgement frame.

7. The wireless access point according to claim 6, wherein there are a plurality of target stations,
wherein transmitting the identification frame to the target station comprises: transmitting the identification frame to the plurality of target stations;
wherein receiving the predetermined acknowledgement frame returned by the target station comprises: receiving a plurality of predetermined acknowledgement frames synchronously returned by the plurality of target stations, wherein the plurality of target stations correspond to a plurality of predetermined acknowledgement frames one by one.

8. The wireless access point according to claim 6, wherein the identification frame comprises six fields, wherein a first field comprises a frame type and a subframe type, a second field comprises a duration, a third field comprises a broadcast address, a fourth field comprises an address of a wireless access point, a fifth field comprises the station identification information, and a sixth field comprises a frame check sequence.

* * * * *